Inventors
HANS WERNER JOHANNSEN
and
WALTER KELLER

Inventors:
HANS WERNER JOHANNSEN
and
WALTER KELLER
BY
ATTORNEY

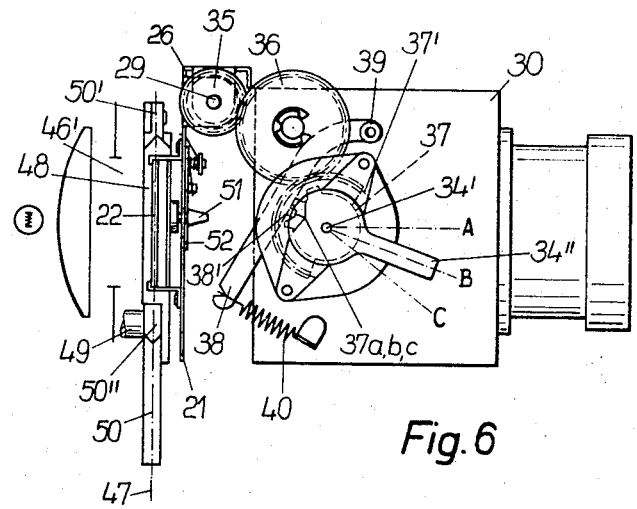

United States Patent Office 3,414,352
Patented Dec. 3, 1968

3,414,352
MECHANISM FOR FOCUSING SLIDE PROJECTORS
Hans Werner Johannsen, Frankfurt am Main, and Walter Keller, Schwalbach, Taunus, Germany, assignors to Braun Aktiengesellschaft
Filed Dec. 5, 1966, Ser. No. 599,170
Claims priority, application Germany, Dec. 11, 1965, B 84,938
13 Claims. (Cl. 353—101)

ABSTRACT OF THE DISCLOSURE

A slide projector with two built-in focusing marks. These marks are moved by carrier means into position on either side of the image plane, and the projector is focused so that both marks are sharply projected. Then, the marks are moved out of position, leaving the image plane vacant for the insertion of a slide.

Field of the invention

The present invention relates to a mechanism for achieving the sharp focusing or setting of slide projectors by means of a focusing or sighting mark comprising two comparative planes which have different markings and extend parallel with respect to each other and at right angle to the optical axis, and between which the image plane will come to be positioned during the focusing operation.

Background of the invention

For the purpose of focusing projectors, it is known to use a setting disk having two raster or scanning surfaces being parallel to one another and positioned in different planes. Such a disk is so inserted, for the use thereof, into the aperture of the projector that the image plane will preferably be positioned in the center between the two raster or scanning surfaces of the setting disk which are offset with respect to each other in the optical axis. When these two raster or scanning surfaces are positioned in the depth of focus range of the optical system of the projector, both rasters can be sharply projected at the same time on the projection surface. In this case the focusing range may be so dimensioned that any possible variations from the image plane of the projector in the focal positions of the slides which are to be projected and are preferably enclosed within the same frames are positioned between the two surfaces of the raster so that a subsequent focusing of the projecting lens during the showing is no longer necessary.

The known setting disks serving for focusing slide projectors must be introduced into the aperture of the objective like an individual slide. Such a single disk is not suitable for continuous use. It will generally be stored in a slide container and will be found therein again only when the slides being stored there are intended to be projected once more; mostly after a prolonged period of time. The disk is accordingly not available at all times but may instead easily be lost. Consequently, the provision of the known setting disks in no way adequately meets the basic intended use thereof, namely the constantly recurring, single focusing of the projecting lens prior to the projection of a series of slides.

Summary of the invention

All of the disadvantages and drawbacks mentioned hereinabove are effectively eliminated with the aid of the focusing mechanism or system as proposed by the present invention which comprises a focusing or sighting mark having two comparative planes extending parallel with respect to each other and at right angle to the optical axis, in that the focusing or sighting mark is disposed at a carrier being positioned and, respectively, guided at the projector housing, which carrier transports the focusing or setting mark from the starting position thereof outside of the path of rays into the image plane of the projector and from there back into the starting position, at which time the carrier is locked or arrested, in the operating position thereof holding the setting disk in the image plane, by means of a stop or locking mechanism and, after the release of this locking mechanism, is returned into the starting position thereof which holds the focusing or setting mark outside of the path of rays by a pressure spring being stressed or under tension during the insertion thereof into the image plane.

The focusing or setting mark which is coordinated to the focusing mechanism or system is thus organically connected with the projector and is available at all times whenever needed, if desired also during the presentation of the slides.

In a slide projector with either semi-automatic or fully-automatic slide-changing device, the focusing or setting mark may actually reach or extend into the image plane of the projector only if the slide-changing element, without having seized and, respectively, taken along a slide, is in the projecting position. In all other operating phases of the slide-changing device, the image plane of the projector is blocked by the transporting arms of the slide-changing element or member which pushes or pivots the slide to and fro in the plane of slide change.

In the case of the connection of the focusing mechanism with a projector of this type, there arises the danger that, with the focusing or setting mark having been introduced into the image plane, the slide-changing element between the transporting arms of which the setting mark is positioned may inadvertently be set into motion whereby one transporting arm strikes against the setting mark and will either tilt or cant the latter with respect to the carrier thereof, or press it against the frame of the aperture of the projector. At that time and in such case, at least the setting mark with the carrier thereof can be damaged, and with that the focusing device and possibly also the changing mechanism of the projector are temporarily rendered inoperative.

In order to exclude this possibility of a faulty operation of the slide-changing device in a slide projector being additionally equipped with the focusing mechanism or system, the carrier of the setting mark is in operative engagement with switching means which will bring the changing mechanism of the projector to a standstill when the setting mark is inserted into the image plane. The stoppage of the changing mechanism may be effected either mechanically, namely by disconnecting a coupling or connection between the slide-changing element and the drive thereof, or electrically, namely by opening the circuit for the motor driving the slide-changing element and, respectively, for a coupling or connection between the slide-changing element and the drive thereof which may be released or tripped electromagnetically.

Such a safety arrangement does not preclude the attempt to bring the setting mark into the image plane of the projector which is already filled or occupied by a slide or by a transporting arm of the slide-changing element and, in the latter case, the path of the setting mark into the image plane may also be blocked by a diaphragm which pivots into the path of projecting rays during the change of slides.

It is true that the presence of such an obstacle will be distinctly noticeable when the setting mark is inserted manually, namely from the resistance which is opposed to such action, so that the person showing the slides will release the setting handle, thus enabling the carrier of the setting mark to jump back into the starting position thereof.

However, particularly during the mechanical insertion of the setting mark, and also during the rapid manual insertion thereof into the image plane there exists the danger that, as a result of a strong butting of the setting mark or of its carrier against the obstacle which is positioned in its path, the elements thereof being sensitive to impacts, for example a slide being positioned in the image plane, or the setting mark which is made from a glass body, may be damaged.

In order to eliminate also this element of danger, it is advantageous to provide an overload clutch in the gear system between the carrier of the setting mark and the actuating member being coordinated thereto, which clutch will disengage the operative connection between the carrier of the setting mark and the actuating member thereof in the event a mechanical resistance is present in the path of movement of the carrier being directed toward the image plane.

As a result, the parts of the focusing mechanism and of the slide-changing mechanism of the projector which are movable in the range of the image plane are essentially protected in every case against mutual damages.

Advantageously, the carrier of the setting mark is pivotably arranged in the projector housing. It is suitably provided as a frame and disposed in the frame cutout thereof is the focusing or setting mark enclosing comparative surfaces or planes which have different markings, are parallel with respect to each other and extend at right angle to the optical axis.

The setting mark itself may be provided in various ways according to the invention. It may comprise, for example, a marking body which is disposed at the carrier frame and, respectively, is formed from or constituted by the latter, and which extends over both comparative planes of the focusing range. Such a marking body may be an angularly bent band or strip of opaque material in the comparative planes of the focusing range, which markings are constituted by differently disposed and, respectively, shaped recesses.

It is equally possible according to the invention, as has already been set forth, to make the setting mark in a manner known per se from a light-transmissive or transparent body which is advantageously adjustably secured to the frame-like carrier and which has plane parallel comparative surfaces whose mutual distance is determined by the depth of focus of the optical system being employed. The markings or indications serving for the purpose of focusing are applied to the plane surfaces of the glass body either mechanically or chemically, for example photographically.

According to the invention, a clear marking or indication which is particularly favorable for focusing is afforded by two concentric rings having different diameters which are disposed offset with respect to one another in the optical axis in the distance of the comparative planes. Such a pair of rings may be positioned in the optical axis of the projector; in other words, in the center of the image. It is also possible, however, to provide several pairs of rings in the visible field of the comparative planes of the setting mark and, in this case, the size of the slide to be projected is simultaneously indicated, during the focusing operation, with four pairs of rings being arranged at the corners of the image field.

For the latter purpose, however, also the frame-like or frame-shaped carrier of the setting disk may be provided with markings which are constituted, for example, of openings and which characterize the contour of the slide to be projected.

The present invention will now be further described hereinafter in several embodiments thereof on the basis of the accompanying drawings, wherein other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 6 is a top plan view of the same mechanism or system with the setting mark having been pivoted into the image plane, and FIGURE 7 illustrates the overload clutch of this mechanism or system at an enlarged scale.

Figure 1:
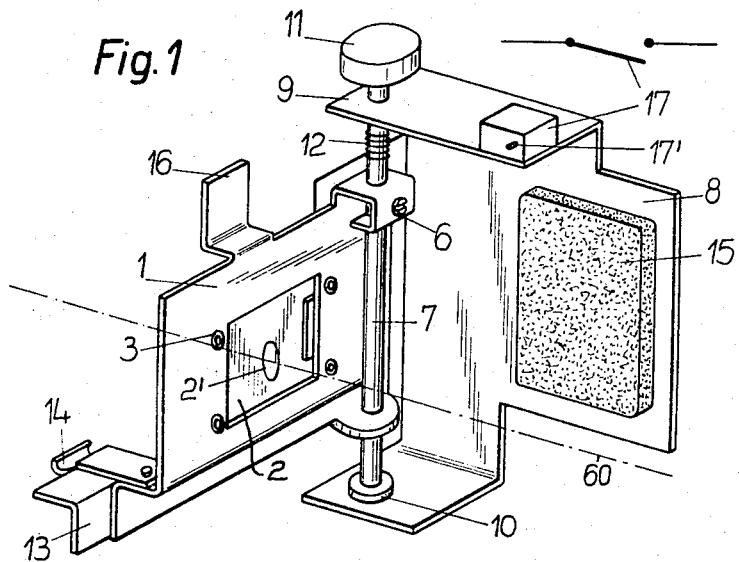
FIGURE 1 illustrates the focusing mechanism or system proposed by the present invention in the operating position thereof and comprising a carrier of the setting mark which stops the changing mechanism of the projector when pivoting into the image plane.
Figure 2:
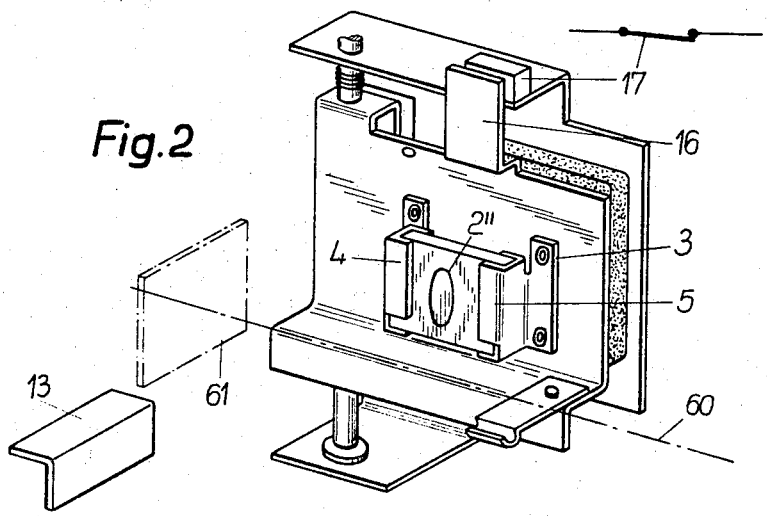
FIGURE 2 shows the starting position thereof outside of the path of projecting rays, both FIGURES 1 and 2 being perspective views.

The focusing mechanism illustrated in FIGURES 1 and 2 comprising a frame-like carrier 1 and provided thereon as setting mark is a transparent setting disk 2. Applied to the plane surfaces thereof being parallel to each other are two concentric rings 2' and 2", one on each side, having different diameters. The settings disk 2 is immovably fixed in position with the aid of two brackets 4 and 5 which are secured to the frame 1 by means of tubular rivets 3. These tubular rivets are spaced with respect to each other as corresponds to the outline or contour of the slide so that the projecting light beam will pass therethrough during the focusing of the projecting lens, whereby the size of the slides to be projected may be aligned with respect to the projected wall.

The carrier 1, being secured in position by positioning screw 6, is non-rotatably mounted on a shaft 7 which is rotatably supported at 9 and 10 on a stationary housing part 8 of the slide projector. Secured to the end of the shaft 7 projecting out of the housing 8 is a setting knob 11. In the initial position the shaft may be turned with the aid of the knob clockwise against the restoring force of a torsion spring 12 coiled therearound which latter is supported, on the upper side, against the housing part 8 and, on the bottom side, on the frame carrier 1. According to FIGURE 2, the frame 1 with the setting disk 2 is pivoted out of the initial position out of the path of projecting rays into the image plane of the projector. In the operating position, shown in FIG. 1 in the image plane, the frame 1 is fixed by a stop mechanism comprising a ledge 13 extending parallel to the image plane and rigidly attached to the housing but adjustable in the direction of the optical axis 60. When flat spring 14, which is offset at the free end thereof, overlaps the ledge 13, the setting disk 2 assumes its operating position. Its two plane surfaces are then positioned at the same distance from the image plane and parallel thereto so that, with the sharp focusing of the two markings 2' and 2" on the projection wall, the area or range positioned therebetween also will be focused sharply.

The return pivoting of the setting disk 2 into the initial position is accomplished by rotating the setting knob 11 counterclockwise. For this purpose, the flat spring 14 is first lifted above the ledge 13 and thereafter the carrier 1 is pivoted back into the starting position under the action of the torsion spring 12. The frame-like carrier 1 will then abut against an elastic plate 15 at the housing part 8.

The carrier 1 is provided with a stop member 16 which, in the starting position, rests against a button 17' of a safety switch 17, disposed in the circuit of the projector. The switch 17 is closed in the initial position of the setting disk so that a conventional slide changing mechanism of the projector can be set into operation to position one slide 61 at a time into the image plane. When pivoting the setting disk into its operating position, also the stomp member 16 mounted on the carrier 1 will be lifted off the button 17' whereupon the switch 15 will open, thus interrupting the circuit in coordination with the change mechanism of the projector. This switching arrangement effectively prevents operation of the changing mechanism while the setting disk is in the image plane.

FIGURES 3 to 7 show another embodiment of the focusing mechanism proposed by the present invention in which an overload clutch is provided in a gear system 35 to 37 between a carrier 21 of the setting disk and a gear-system drive.

Secured to frame-like carrier 21 is the transparent focusing disk 22 carrying on its plane surfaces the markings 22' and 22". The setting disk 22 is immovably fixed in position with respect to the carrier frame 21 by means of support brackets 24 and 25 attached to the frame.

Figure 3:
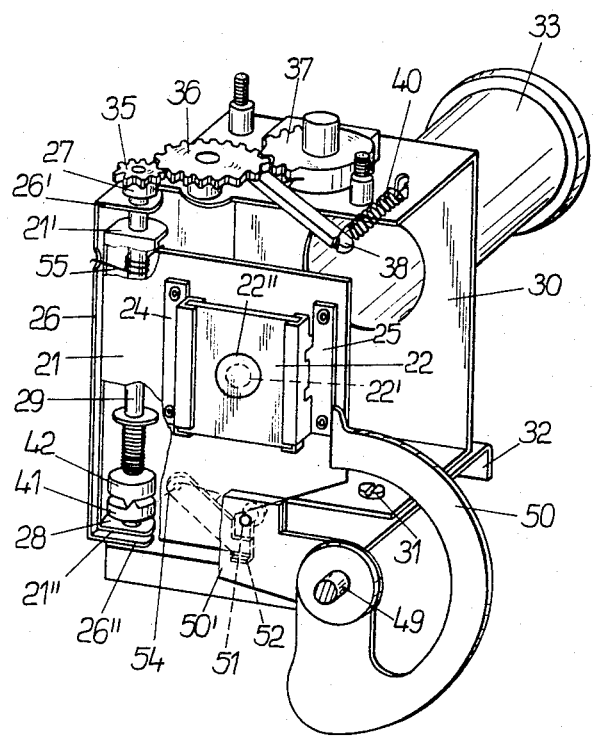
FIGURE 3 illustrates a further embodiment of the focusing mechanism proposed by the present invention, also in a perspective view thereof, wherein an overload clutch is provided in the gear system between the carrier of the setting mark and the drive thereof.
Figure 4:
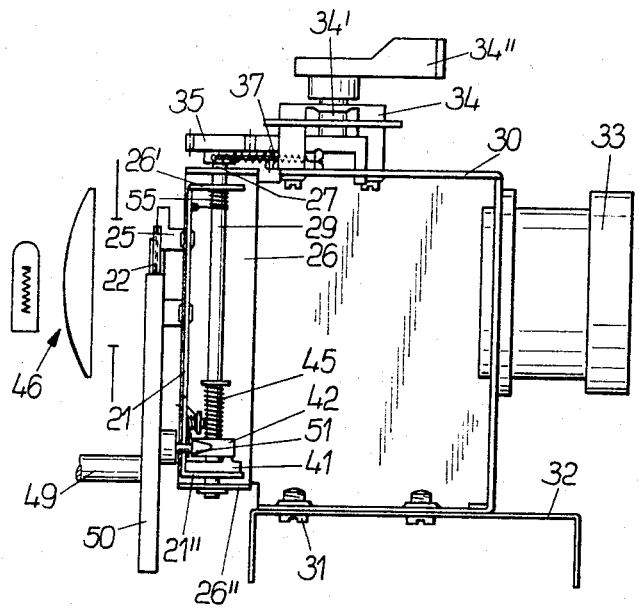
FIGURE 4 is a lateral view of the mechanism or system shown in FIGURE 3.

The carrier 21 is pivotable about a shaft 29, rotatably supported at 27 and 28 on the housing part 26 of the projector. As shown in FIG. 3 the housing part 26 comprising bearing brackets 26' and 26" is rigidly connected with a housing frame 30 which is attached to the projector housing 32 at 31, and holds the focusing device, the projecting lens 33 and a central switch 34 shown in detail in FIGS. 5 and 6.

Mounted on the end of the shaft 29 which projects beyond the housing frame 20 is a gear 35 which is in operative engagement, by means of an intermediate gear wheel 36, with a toothed segment 37' mounted on the axle 34' of the central switch 34 shown in detail in FIG. 6. The toothed segment 37' shown in FIGS. 3 and 6 is part of a wheel 37 and provided at the circumference of the latter and below the tooth segment 37' are a plurality of stop notches 37a, 37b and 37c shown in detail in FIGS. 5 and 6. These notches cooperate with a stop lever 38 to lock the notched disk 37 in three different rotary positions A, B and C, FIG. 6 of the central switch 34. The stop lever pivoting about the pin 39 is pulled by a spring 40 toward the notched disk 37, at which time a lug 38' thereof locks in one of the notches 37a, 37b or 37c, depending upon the switching position of the central switch 34. With the central switch 34 and conventional switch contacts, the circuits for the light source and the changing mechanism of the projector are also either opened or closed. A switch lever 34" mounted on shaft 34' serves for the manual actuation of the central switch 34.

The carrier 21 of the setting disk 22 is mounted by way of the two rectangularly bent bearing parts 21' and 21", with play on the shaft 29. The bearing 21", as is apparent particularly from FIGURE 7, is rigidly connected to a coupling sleeve 41 on which the carrier 21 is freely rotatable about the shaft 29. An axially projecting nose portion 41' of the coupling sleeve protrudes into the area of the nose portion 42' of a coupling sleeve 42 mounted on the shaft 29. This coupling sleeve is disposed at the circumference of the shaft 29 and is nonrotatable with respect to the latter but axially displaceable, which is accomplished by means of a two-cornered or four-cornered guide 43. A compression spring 45, supported against an annular shoulder portion 44 surrounding the shaft 29, forces the drive sleeve 42 against the drive sleeve 41, thus forming an overload clutch between the carrier 21 of the setting disk 22 and the drive shaft 29 thereof.

*Operation*

Figure 5:
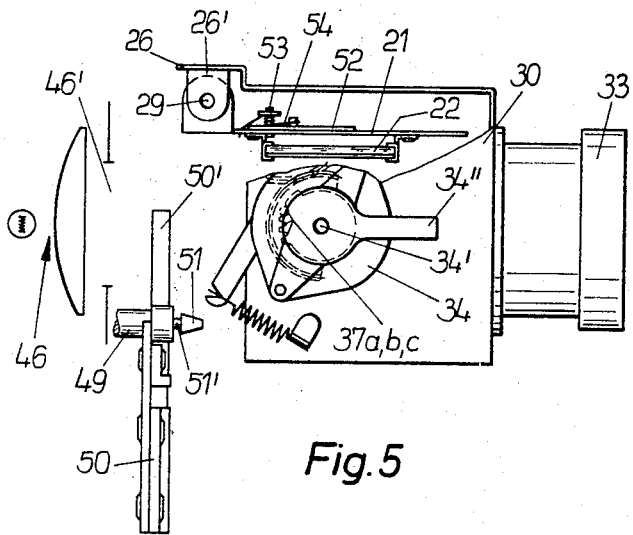
FIGURE 5 is a top plan view of the same mechanism or system with the setting mark being in the starting position thereof.

In the position A of the switch lever, as shown in FIGURE 5, all of the operating circuits of the projector are interrupted by the central switch 34 and the setting disk 22 on the carrier 21 is in the initial position outside of the path of rays produced by the illuminating optical system 46 and delimited by the aperture 46'.

When the switch lever is rotated clockwise toward the position B in FIG. 6, the lamp circuit of the projector is closed. Moreover, the setting disk 22 is pivoted with the carrier 21 into the image plane 47 of the projector by means of the gear drive 37, 36, 35, the shaft 29 and the overload clutch 42, 41. The setting disk 22 comes into the free space 48 between the slide-holding jaws 50' and 50", as shown in FIG. 5, of the slide-changing member 50. The slide-changing member is a gripper clamp and swings about the axle 49 from a conventional slide magazine into the projecting position and back. A conical lock bolt 51 cooperating with a stop arm 52 of the carrier 21 is mounted as shown in FIG. 5, to the slide-changing member 50. The stop arm 52, as shown in FIGS. 5 and 7, is pivotable about the axle 53 of the carrier 21. It is biased under the action of a torsion spring 54 coiled around this axle. The stop arm slides on the cone of the stud 51 when the carrier 21 is pivoted into the operating position and springs into the groove 51' thereof as soon as the setting disk 22 is positioned in the image plane 47. In this position of the carrier 21, the switching lever 34" has not yet attained its position B determined by the stop notch 37b of the notched disk 37. Due to the remaining switching path of the notched disk 37 still remaining before the operating position B is attained, the nose portion 42' of the drive sleeve 42, rotatable with the shaft 29, is lifted above the nose portion 41' of the drive sleeve 41 connected with the carrier 21, so that the carrier 21, fixed in its position by the stud 51 of the slide-changing member 50, is released from the drive and can return into the initial or starting position. A torsion spring 55 coiled around the shaft 29 forces the stop lever 52 of the setting disk carrier against the end wall of the annular groove 51' toward the initial position of the carrier. The lock bolt stud 51 is adjustable in the direction of the optical axis. The position of the setting disk with respect to the image plane is thus defined and, in this position, the projecting lens may be sharply focused.

When both setting rings 22' and 22" of the disk 22 are sharply projected on the projection screen, the switching lever 34" of the central switch is brought into the position C, the change mechanism of the projector thus being released for operation. The slide-changing element 50 first pivots back into the magazine area so as to render possible the insertion of the first slide into the plane of the slide changer. Its plane is identical with the image plane.

When the slide-changing member 50 is pivoted out of the projecting position, the lock bolt stud 51 thereof glides out of engagement with the stop lever 52, whereupon the released carrier 21, under action of the tensioned spring 55, pivots about the shaft 29 out of the path of rays and back into the initial position thereof as shown in FIGURE 5.

The lock bolt 51 which fixes the carrier 21 in the operating position may, of course, be provided also on a differently constructed slide-changing means which may, for example, be linearly displaceable. It is also quite conceivable and encompassed in the spirit of the present invention to provide a separate locking bolt, movably situated in a free image plane, in the region of the setting disk carrier by means of the slide-changing mechanism of the projector in order to fix the setting disk in the image plane during the focusing operation.

If the slide-changing member 50 for some reason attempts to assume its magazine position while the switch lever 34" is being brought toward position B of the central disk, the setting disk 22 or the carrier 21 thereof and the supports 24, 25 will strike—during the operation of pivoting into the image plane—against the transporting arm 50' of the slide-changing member. The carrier 21 thus cannot complete its pivoting for the insertion of the setting disk 22 into the image plane. When the switch lever 34″ is further rotated into the position B, the overload clutch 41, 42 between the drive shaft 29 and the carrier 21 is therefore overcome so that the carrier, together with the setting disk 22, will pivot under the spring tension 55 out of the path of rays and back into the initial position shown in FIGURE 5.

The same applies also when a slide gripped by a slide-changing member 50 is already positioned in the image plane 47.

As a consequence, any danger of damage to functionally important parts of the projector or to a slide positioned in the image plane, which might arise if an obstacle is present in the pivoting path of the setting disk, is essentially eliminated.

By turning back the switch lever 34″ from position C into position A, i.e., the switching-off position of the projector, the drive shaft 29 is also turned back by means of the gear system 37, 36, 35. In the course of the return path of the drive shaft 29 in the counterclockwise direction, the drive sleeve 42 with the nose portion 42′ thereof will again move over the nose portion 41′ of the drive sleeve 41 secured to the carrier 21, whereupon the overload clutch 41, 42 will once more occupy and assume its coupling position guaranteeing the pivoting of the setting disk 22 into the image plane.

Prior to the renewed connection or switching-on of the changing mechanism, the focusing disk is thus initially pivoted again into the image plane of the projector so that the optical system may be adjusted to an optimum depth of focus range prior to the projection of a new series of slides.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

What is claimed is:

1. A slide projector including a housing, a focusable lens, a light source and an image plane between the lens and the light source, into which plane slides can be placed for their projection, wherein the improvement comprises: a setting means having two plane parallel surfaces, each of said surfaces having a distinguishable, projectable mark; a carrier (1, 21) having said setting means mounted thereto, said carrier being movably mounted to said housing, the movement thereof being between two limits; the two surfaces of said setting means straddling the image plane and lying perpendicular to the optiacl axis of said lens in one limit of said movement; said setting means and carrier being completely clear of the image plane in the other limit; a force-potential means (12, 55) forcing said carrier toward said other limit; and a locking means (13, 14; and 51, 52) capable of holding said carrier in said one limit.

2. A slide projector as claimed in claim 1, further including an actuatable slide changing means, wherein the improvement further comprises a switching means (17, 34) preventing actuation of the slide changing means when said carrier is in the region of said one limit.

3. A slide projector as claimed in claim 1, wherein the improvement further comprises: an actuating means (34) connected to said carrier to enable its movement; and an overload clutch means (41, 42) between said actuating means and said carrier to disconnect them when said carrier experiences a minimum resisting force.

4. A slide projector as claimed in claim 1, wherein said carrier is pivotally mounted to said housing.

5. A slide projector as claimed in claim 3, wherein said carrier is pivotally mounted to said housing; said overload clutch means including a sleeve (42) mounted to said actuating means coaxial with the carrier pivot axis, and a sleeve (41) mounted to said carrier coaxial pivot axis; said sleeves having mutually engaging teeth; the plane of teeth engagement being inclined to the carrier pivot axis; said sleeves being axially relatively movable and rotating with their respective mounts; and a means to bias the sleeves together.

6. A slide projector as claimed in claim 1, said locking means including a flat spring (14) mounted to said carrier and a ledge (13) mounted to said housing; said ledge being adjustable in the direction of the lens optical axis; said spring having means to clamp over said ledge to hold said carrier tightly to said ledge.

7. A slide projector as claimed in claim 4, further including an actuatable slide changing means; said locking means including a stop lever (52) pivotally connected to said carrier, a spring (54) mounted between said carrier and said lever and holding said lever in a minimum position, and a stud (51) mounted to said changing means; said stud having a base recess (51′); said stop lever sliding out of its minimum position along said stud and finally springing into said base recess (51′) as said carrier is moved into said one position when said changing means is in its slide projecting position without a slide in its jaws (50′, 50″); said stop lever being released from said base recess as said changing means is removed from its slide projecting position.

8. A slide projector as claimed in claim 7, said stud being adjustably mounted to said changing means.

9. A slide projector as claimed in claim 2, wherein said improvement further comprises an actuating means (34) connected to said carrier to enable its movement; said actuating means having three positions, there being a switching-off position A, an intermediate position B in which said carrier is locked in said one limit of its movement, and an operating position C in which said carrier is released from said one limit.

10. A slide projector as claimed in claim 4, wherein said setting means comprises a marking body formed as part of the carrier and extending over both comparative planes of the focusing range.

11. A slide projector as claimed in claim 10, wherein said marking body comprises an angularly bent strip of opaque material having differently arranged and shaped recesses serving as marking.

12. A slide projector as claimed in claim 4, wherein said setting means comprises a glass body (2, 22) adjustably secured to said carrier (1, 21), and wherein said carrier comprises markings in the form of openings for characterizing the size of the slide to be projected.

13. A slide projector as claimed in claim 4, wherein said setting means comprises two concentric rings having different diameters and offset with respect to each other in the distance of the comparative planes, and wherein several pairs of rings are provided in the visible field of the comparative planes of the setting mark coordinated to the corners of the image field for indicating the size of the slide to be projected.

References Cited

FOREIGN PATENTS

| 64,487 | 5/1946 | Denmark. |
| 1,224,422 | 2/1960 | France. |
| 618,823 | 9/1935 | Germany. |

NORTON ANSHER, *Primary Examiner.*

ROBERT P. GREINER, *Assistant Examiner.*